US012643423B2

(12) United States Patent 
Kubota

(10) Patent No.: US 12,643,423 B2 
(45) Date of Patent: Jun. 2, 2026

(54) HYBRID ELECTRIC VEHICLE MANAGEMENT DEVICE, HYBRID ELECTRIC VEHICLE MANAGEMENT METHOD, AND HYBRID ELECTRIC VEHICLE MANAGEMENT SYSTEM

(71) Applicant: TOYOTA JIDOSHA KABUSHIKI KAISHA, Toyota (JP)

(72) Inventor: Tomoyuki Kubota, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 18/064,991

(22) Filed: Dec. 13, 2022

(65) Prior Publication Data

US 2023/0234465 A1 Jul. 27, 2023

(30) Foreign Application Priority Data

Jan. 25, 2022 (JP) ................................. 2022-009236

(51) Int. Cl.
B60L 53/63 (2019.01)
B60L 53/50 (2019.01)
B60L 58/12 (2019.01)

(52) U.S. Cl.
CPC ............... B60L 53/63 (2019.02); B60L 53/50 (2019.02); B60L 58/12 (2019.02)

(58) Field of Classification Search
CPC .......... B60L 53/63; B60L 53/50; B60L 58/12; B60L 53/64; B60L 53/65; B60L 53/665;

B60L 55/00; B60L 50/16; B60L 53/14; B60L 53/305; B60L 53/66; Y02T 10/62; Y02T 10/70; B60K 6/28

See application file for complete search history.

(56) References Cited

U.S. PATENT DOCUMENTS

2010/0134067 A1* 6/2010 Baxter .................. B60L 3/0084
320/109
2013/0297126 A1* 11/2013 Yamazaki ............. B60W 10/08
180/65.265

(Continued)

FOREIGN PATENT DOCUMENTS

| CN | 112937321 A | 6/2021 |
| JP | 2018-099920 A | 6/2018 |
| JP | 2021-093831 A | 6/2021 |

*Primary Examiner* — Kenneth J Malkowski
*Assistant Examiner* — Ibrahim Abdoalatif Alsomairy
(74) *Attorney, Agent, or Firm* — Finnegan, Henderson, Farabow, Garrett and Dunner, LLP

(57) ABSTRACT

A hybrid electric vehicle management device configured to manage a hybrid electric vehicle that includes an internal combustion engine and that is configured to perform either or both of external charging and external discharging, includes a processor. The processor is configured to acquire vehicle information of a first hybrid electric vehicle and vehicle information of a second hybrid electric vehicle. The vehicle information includes information on the amount of fuel remaining in the hybrid electric vehicle. The processor selects, based on the vehicle information, the first hybrid electric vehicle as a hybrid electric vehicle to which either or both of the external charging and the external discharging is to be requested. The amount of fuel remaining in the first hybrid electric vehicle is larger than the amount of fuel remaining in the second hybrid electric vehicle.

2 Claims, 7 Drawing Sheets

(56)  References Cited

U.S. PATENT DOCUMENTS

| | | | | |
|---|---|---|---|---|
| 2018/0170194 | A1* | 6/2018 | Ichikawa | ............... B60W 10/26 |
| 2018/0272878 | A1* | 9/2018 | Lee | ........................ B60L 53/665 |
| 2020/0324665 | A1* | 10/2020 | Mackenzie | ............. B60L 53/22 |
| 2021/0023959 | A1* | 1/2021 | Ohta | ........................ B60L 53/66 |
| 2021/0170902 | A1 | 6/2021 | Tsuchiya | |
| 2021/0276528 | A1* | 9/2021 | Choi | ..................... B60W 10/08 |
| 2023/0166717 | A1* | 6/2023 | Hancock | ............... B60W 20/13 |
| | | | | 701/22 |

* cited by examiner

HYBRID ELECTRIC VEHICLE MANAGEMENT DEVICE, HYBRID ELECTRIC VEHICLE MANAGEMENT METHOD, AND HYBRID ELECTRIC VEHICLE MANAGEMENT SYSTEM

CROSS-REFERENCE TO RELATED APPLICATION

This application claims priority to Japanese Patent Application No. 2022-009236 filed on Jan. 25, 2022, incorporated herein by reference in its entirety.

BACKGROUND

1. Technical Field

The present disclosure relates to hybrid electric vehicle management devices, hybrid electric vehicle management methods, and hybrid electric vehicle management systems.

2. Description of Related Art

For example, Japanese Unexamined Patent Application Publication No. 2018-099920 (JP 2018-099920 A) discloses a cloud server (management device) that acquires vehicle information of vehicles configured to perform external charging. The cloud server determines whether a target vehicle can perform external charging at the destination, by using the vehicle information of other vehicles whose destination is the same as that of the target vehicle out of the acquired vehicle information. The vehicle information includes vehicle type information indicating whether the vehicle is a vehicle without an internal combustion engine or a vehicle with an internal combustion engine. The cloud server determines whether the vehicle can perform external charging at the destination, by using the vehicle type information. With this configuration, those vehicles without an internal combustion engine, namely having high priority for external charging, can be preferentially caused to perform external charging at the destination.

SUMMARY

In JP 2018-099920 A, as described above, the priority for external charging is determined based on whether the vehicle is equipped with an internal combustion engine. However, JP 2018-099920 A does not consider the priority for external charging when a plurality of vehicles is equipped with an internal combustion engine. Accordingly, it is sometimes not possible to select an appropriate vehicle as a vehicle that is to perform external charging when a plurality of vehicles is equipped with internal combustion engine. In this case, the vehicle selected as a vehicle that is to perform external charging may run out of electricity or become short of fuel, etc., which may affect traveling of the selected vehicle, Therefore, a device (system) is desired that can reduce the possibility that traveling of the vehicle that is to perform external charging (and external discharge) may be affected.

The present disclosure provides a hybrid electric vehicle management device, hybrid electric vehicle management method, and hybrid electric vehicle management system that can reduce the possibility that traveling of a hybrid electric vehicle that is to perform external charging (external discharging) may be affected even when each of a plurality of vehicles is equipped with an internal combustion engine.

A hybrid electric vehicle management device according to a first aspect of the present disclosure, is configured to manage a hybrid electric vehicle. The hybrid electric vehicle includes an internal combustion engine configured to generate electric power, an electric traction motor, and a power storage unit that supplies electric power to the electric traction motor. The hybrid electric vehicle is configured to perform either or both of external charging in which the power storage unit is charged with electric power from an electrical network and external discharging in which electric power in the power storage unit is supplied to the electrical network. The hybrid electric vehicle management device includes a processor. The processor is configured to acquire vehicle information of a first hybrid electric vehicle and vehicle information of a second hybrid electric vehicle by communicating with each of the first hybrid electric vehicle and the second hybrid electric vehicle. The vehicle information of the first hybrid electric vehicle includes information on whether the first hybrid electric vehicle is equipped with the internal combustion engine, information on whether the first hybrid electric vehicle is able to perform either or both of the external charging and the external discharging, and information on an amount of fuel remaining in the first hybrid electric vehicle. The vehicle information of the second hybrid electric vehicle includes information on whether the second hybrid electric vehicle is equipped with the internal combustion engine, information on whether the second hybrid electric vehicle is able to perform either or both of the external charging and the external discharging, and information on an amount of fuel remaining in the second hybrid electric vehicle. The hybrid electric vehicle includes the first hybrid electric vehicle and the second hybrid electric vehicle. The processor is configured to select, based on the vehicle information of the first hybrid electric vehicle and the vehicle information of the second hybrid electric vehicle, the first hybrid electric vehicle as a hybrid electric vehicle to which either or both of the external charging and the external discharging is to be requested. The amount of fuel remaining in the first hybrid electric vehicle is larger than the amount of fuel remaining in the second hybrid electric vehicle.

In the hybrid electric vehicle management device according to the first aspect, as described above, the processor selects, out of the first hybrid electric vehicle and the second hybrid electric vehicle, the first hybrid electric vehicle with a large amount of fuel remaining as a hybrid electric vehicle to which either or both of the external charging and the external discharging is to be requested, based on the vehicle information of the first hybrid electric vehicle and the vehicle information of the second hybrid electric vehicle. Since a relatively large amount of fuel remains in the first hybrid electric vehicle, the first hybrid electric vehicle can travel a relatively long distance with the fuel even when its state of charge (SOC) is greatly reduced due to traveling before the external charging (or due to the external discharging). Since a relatively large amount of fuel remains in the first hybrid electric vehicle, the first hybrid electric vehicle can generate a relatively large amount of electric power by the fuel. This can reduce the possibility that the first hybrid electric vehicle may run out of electricity when the SOC of the first hybrid electric vehicle is greatly reduced due to traveling before the external charging (or due to the external discharging). Accordingly, the possibility that traveling of the hybrid electric vehicle to which the external charging (external discharging) has been requested may be affected can be reduced by selecting the first hybrid electric vehicle with a large amount of fuel remaining as a hybrid electric vehicle to which the external charging (external discharging) is to be requested.

In the hybrid electric vehicle management device according to the first aspect, the processor may be configured to perform control to also request the external charging to the second hybrid electric vehicle when a predicted increase in power demand of the electrical network due to the external charging of the first hybrid electric vehicle is smaller than a target value.

A hybrid electric vehicle management method according to a second aspect of the present disclosure is a method for managing a hybrid electric vehicle. The hybrid electric vehicle includes an internal combustion engine configured to generate electric power, an electric traction motor, and a power storage unit that supplies electric power to the electric traction motor. The hybrid electric vehicle is configured to perform either or both of external charging in which the power storage unit is charged with electric power from an electrical network and external discharging in which electric power in the power storage unit is supplied to the electrical network. The hybrid electric vehicle management method includes acquiring vehicle information of a first hybrid electric vehicle and vehicle information of a second hybrid electric vehicle through communication with each of the first hybrid electric vehicle and the second hybrid electric vehicle. The vehicle information of the first hybrid electric vehicle includes information on whether the first hybrid electric vehicle is equipped with the internal combustion engine, information on whether the first hybrid electric vehicle is able to perform either or both of the external charging and the external discharging, and information on an amount of fuel remaining in the first hybrid electric vehicle. The vehicle information of the second hybrid electric vehicle includes information on whether the second hybrid electric vehicle is equipped with the internal combustion engine, information on whether the second hybrid electric vehicle is able to perform either or both of the external charging and the external discharging, and information on an amount of fuel remaining in the second hybrid electric vehicle. The hybrid electric vehicle includes the first hybrid electric vehicle and the second hybrid electric vehicle. The hybrid electric vehicle management method further includes selecting, based on the vehicle information of the first hybrid electric vehicle and the vehicle information of the second hybrid electric vehicle, the first hybrid electric vehicle as a hybrid electric vehicle to which either or both of the external charging and the external discharging is to be requested. The amount of fuel remaining in the first hybrid electric vehicle is larger than the amount of fuel remaining in the second hybrid electric vehicle.

In the hybrid electric vehicle management method according to the second aspect, as described above, the first hybrid electric vehicle with a large amount of fuel remaining is selected as a hybrid electric vehicle to which either or both of the external charging and the external discharging is to be requested out of the first hybrid electric vehicle and the second hybrid electric vehicle, based on the vehicle information of the first hybrid electric vehicle and the vehicle information of the second hybrid electric vehicle. As described above, the first hybrid electric vehicle with a relatively large amount of fuel remaining can travel a relatively long distance with the fuel, and can generate a relatively large amount of electric power by the fuel. Therefore, the first hybrid electric vehicle is less likely to run out of electricity. Therefore, the hybrid electric vehicle management method can be provided that can reduce the possibility that traveling of the hybrid electric vehicle to which the external charging (external discharging) has been requested may be affected, by selecting the first hybrid electric vehicle with a large amount of fuel remaining as a hybrid electric vehicle to which the external charging (external discharging) is to be requested.

A hybrid electric vehicle management system according to a third aspect of the present disclosure includes a hybrid electric vehicle and a management device. The hybrid electric vehicle includes an internal combustion engine configured to generate electric power, an electric traction motor, and a power storage unit that supplies electric power to the electric traction motor. The hybrid electric vehicle is configured to perform either or both of external charging in which the power storage unit is charged with electric power from an electrical network and external discharging in which electric power in the power storage unit is supplied to the electrical network. The hybrid electric vehicle includes a first hybrid electric vehicle and a second hybrid electric vehicle. The management device is configured to acquire vehicle information of the first hybrid electric vehicle and vehicle information of the second hybrid electric vehicle by communicating with each of the first hybrid electric vehicle and the second hybrid electric vehicle. The vehicle information of the first hybrid electric vehicle includes information on whether the first hybrid electric vehicle is equipped with the internal combustion engine, information on whether the first hybrid electric vehicle is able to perform either or both of the external charging and the external discharging, and information on an amount of fuel remaining in the first hybrid electric vehicle. The vehicle information of the second hybrid electric vehicle includes information on whether the second hybrid electric vehicle is equipped with the internal combustion engine, information on whether the second hybrid electric vehicle is able to perform either or both of the external charging and the external discharging, and information on an amount of fuel remaining in the second hybrid electric vehicle. The management device is configured to select, based on the vehicle information of the first hybrid electric vehicle and the vehicle information of the second hybrid electric vehicle, the first hybrid electric vehicle as a hybrid electric vehicle to which either or both of the external charging and the external discharging is to be preferentially requested. The amount of fuel remaining in the first hybrid electric vehicle is larger than the amount of fuel remaining in the second hybrid electric vehicle. The management device is configured to request either or both of the external charging and the external discharging to the first hybrid electric vehicle. The first hybrid electric vehicle having accepted the request for either or both of the external charging and the external discharging is configured to perform control to adjust an SOC of the first hybrid electric vehicle.

In the hybrid electric vehicle management system according to the third aspect, as described above, the management device selects, out of the first hybrid electric vehicle and the second hybrid electric vehicle, the first hybrid electric vehicle with a large amount of fuel remaining as a hybrid electric vehicle to which either or both of the external charging and the external discharging is to be requested, based on the vehicle information of the first hybrid electric vehicle and the vehicle information of the second hybrid electric vehicle. As described above, the first hybrid electric vehicle with a relatively large amount of fuel remaining can travel a relatively long distance with the fuel, and can generate a relatively large amount of electric power by the fuel. Therefore, the first hybrid electric vehicle is less likely to run out of electricity. Therefore, the hybrid electric vehicle management system can be provided that can reduce the possibility that traveling of the hybrid electric vehicle to which the external charging (external discharging) has been requested may be affected, by selecting the first hybrid electric vehicle with a large amount of fuel remaining as a hybrid electric vehicle to which the external charging (external discharging) is to be requested.

In the hybrid electric vehicle management system according to the third aspect, as described above, the first hybrid electric vehicle having accepted the request for the external charging (the external discharging) performs control to adjust the SOC of the first hybrid electric vehicle. Since the SOC of the first hybrid electric vehicle having accepted the request for the external charging (the external discharging) is thus further adjusted, the amount of external charging (the amount of external discharging) of the first hybrid electric vehicle can further be increased. As a result, the power demand of the electrical network can further be increased.

In the hybrid electric vehicle management system according to the third aspect, the first hybrid electric vehicle having accepted the request for either or both of the external charging and the external discharging may be configured to adjust an amount by which the SOC of the first hybrid electric vehicle is reduced due to an amount of charging that is requested from the electrical network.

With the present disclosure, the possibility can be reduced that traveling of the hybrid electric vehicle that is to perform the external charging (external discharge) may be affected.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings. The same or corresponding portions are denoted by the same signs throughout the drawings, and description thereof will not be repeated.

First Embodiment

Figure 1:
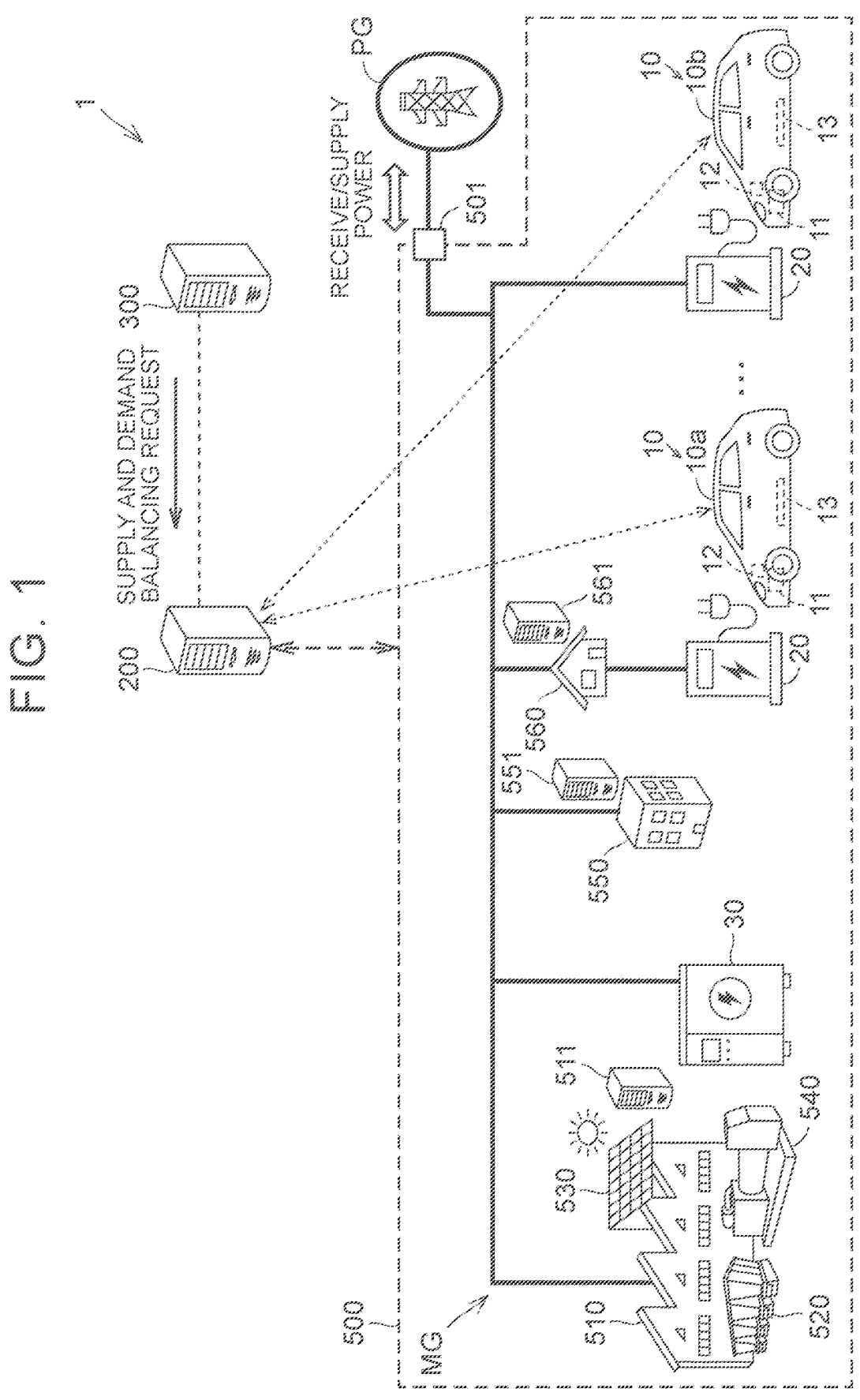
FIG. 1 shows a configuration of an electric power system according to a first embodiment.

FIG. 1 shows a schematic configuration of an electric power system 1 according to a first embodiment of the present disclosure. As shown in FIG. 1, the electric power system 1 includes a power grid PG, a plurality of vehicles 10, an aggregator server 200 (hereinafter simply referred to as the "server 200"), a power transmission and distribution operator server 300 (hereinafter simply referred to as the "server 300"), and a power receiving and transforming facility 501. An aggregator is an electric utility that bundles a plurality of power balancing resources in an area 500 to provide an energy management service. The electric power system 1 and the server 200 are an example of the "management system" and "management device" according to the present disclosure, respectively.

The power grid PG is an electrical network composed of power plants and power transmission and distribution facilities, both not shown. In the present embodiment, an electric power company serves as both a power producer and a power transmission and distribution operator. The electric power company is a general power transmission and distribution operator. The electric power company maintains and manages the power grid. PG. The electric power company is an administrator of the power grid PG. The server 300 is a computer that manages the supply and demand of the power grid PG (electrical network). The server 300 belongs to the electric power company. The power grid PG is an example of the "electrical network" according to the present disclosure.

The aggregator manages the vehicles 10. The server 200 is a computer that manages the vehicles 10. The server 200 belongs to the aggregator. The vehicles 10 include a hybrid electric vehicle 10a and a hybrid electric vehicle 10b. Each of the hybrid electric vehicle 10a and the hybrid electric vehicle 10b includes an engine 11 that can generate electric power, a traction motor 12, and a battery 13 that supplies electric power to the traction motor 12. The engine 11 and the traction motor 12 are an example of the "internal combustion engine" and the "electric traction motor" of the present disclosure, respectively. The battery 13 is an example of the "power storage unit" of the present disclosure. The hybrid electric vehicle 10a and the hybrid electric vehicle 10b are an example of the "first hybrid electric vehicle" and the "second hybrid electric vehicle" of the present disclosure, respectively.

Each of the hybrid electric vehicle 10a and the hybrid electric vehicle 10b is configured to be able to perform external charging, namely configured so that the battery 13 can be charged with electric power from the power grid PG. External charging refers to receiving electric power from the outside of the vehicle 10 to charge the battery 13 of the vehicle 10 with the received electric power. Specifically, the hybrid electric vehicle 10a and the hybrid electric vehicle 10b are so-called plug-in hybrid electric vehicles (PHEVs). The vehicles 10 include vehicles other than PHEVs (e.g., electrified vehicles (EVs)), not shown. The vehicles 10 may include either or both of privately owned vehicles (POVs) and vehicles managed by a Mobility as a Service (MaaS) operator (MaaS vehicles). It is assumed in the present embodiment that the hybrid electric vehicle 10a and the hybrid electric vehicle 10b have the same configuration.

In the area 500, the power balancing resources form a microgrid MG. Power lines for networking the power balancing resources on the microgrid MG may be private power lines. The power receiving and transforming facility 501 is provided at an interconnection point (grid connection point) of the microgrid MG. The power receiving and transforming facility 501 is configured to switch between parallel-on (connection) and parallel-off (disconnection) of the power grid PG and the microgrid MG. When the microgrid MG is connected to the power grid PG, the power receiving and transforming facility 501 receives alternating current (AC) power of, for example, extra high voltage (voltage higher than 7000 V) from the power grid PG, steps down the voltage of the received power, and supplies the resultant power to the microgrid MG. The power receiving and transforming facility 501 includes a high-voltage (primary) switchgear (e.g., a sectionalizer, a disconnector, a circuit breaker, and a load break switch), a transformer, a protective relay, a measuring device, and a control device. The power that the power receiving and transforming facility 501 receives from the power grid PG is not limited to the power of extra high voltage, and may be, for example, power of high voltage (voltage of more than 600 V and 7000 V or less).

The plurality of elements (power balancing resources) included in the area 500 forms the microgrid MG by the elements being electrically connected to each other. Specifically, a plurality of electric vehicle supply equipment (EVSE) units 20, a stationary power storage device 30, a factory 510, industrial equipment 520, a variable renewable energy source 530, a generator 540, a building 550, and a residence 560 are located in the area 500.

Each EVSE unit 20 is an EVSE unit installed in the area 500. Each EVSE unit 20 is electrically connected to the microgrid MG so that power can be transferred between each EVSE unit 20 and the microgrid MG. Each vehicle 10 is configured to be electrically connected to the EVSE unit 20. For example, power can be transferred between the EVSE unit 20 and the vehicle 10 by connecting a charging cable connected to the EVSE unit 20 to an inlet of the vehicle 10. Any desired number of EVSE units 20 can be installed in the area 500. About five EVSE units 20 may be installed in the area 500, 10 or more EVSE units 20 may be installed in the area 500, or 100 or more EVSE units 20 may be installed in the area 500. The EVSE units 20 are installed in the residence 560 and in local facilities (e.g., a shopping mall).

The stationary power storage device 30 is a power storage device installed in the area 500. The stationary power storage device 30 is electrically connected to the microgrid MG so that power can be transferred between the stationary power storage device 30 and the microgrid MG. In the present embodiment, a lithium-ion battery is used as the stationary power storage device 30. The lithium-ion battery may be a battery used in a vehicle (recycled product). The stationary power storage device 30 is not limited to the lithium ion battery, and may be other secondary batteries, or may be power-to-gas (PtG) equipment. In the present embodiment, one stationary power storage device 30 is installed in the area 500. However, any desired number of stationary power storage devices 30 may be installed in the area 500. About five stationary power storage devices 30 may be installed in the area 500, 10 or more stationary power storage devices 30 may be installed in the area 500, or 100 or more stationary power storage devices 30 may be installed in the area 500.

Factory workers etc. go in and out of the factory 510. The factory 510 includes various electrical devices (e.g., lighting fixtures and air conditioners) that are run by the power supplied from the microgrid MG. In the present embodiment, the generators (variable renewable energy source 530 and generator 540) are installed only outside the factory 510. However, the generators may be installed inside the factory 510. A server 511 manages the power state (power consumption, power generation, and power storage) of the factory 510. The server 511 communicates with the server 200 to transmit the power state of the factory 510 to the server 200 and receive a power balancing command for the factory 510 from the server 200.

The industrial equipment 520 is industrial equipment that is used outdoors and, and is run by the power supplied from the microgrid MG. The industrial equipment 520 according to the present embodiment includes an electric melting furnace and a holding furnace for aluminum. The industrial equipment 520 may include either or both of a drainage plant for performing a wastewater treatment and a recycling plant for recycling waste.

The variable renewable energy source 530 refers to an energy source whose power output fluctuates depending on the weather conditions. The variable renewable energy source 530 outputs the generated power to the microgrid MG. The power generated by the variable renewable energy source 530 is variable renewable energy (VRE). Surplus power generated by the variable renewable energy source 530 may be stored in the stationary power storage device 30. In the present embodiment, the variable renewable energy source 530 is photovoltaic (PV) power generation equipment (e.g., a solar panel installed on a roof). However, the present disclosure is not limited to this, and the variable renewable energy source 530 may include wind power generation equipment instead of (or in addition to) the PV power generation equipment.

The generator 540 is a generator that is not a variable renewable energy source. The generator 540 outputs the generated power to the microgrid MG. In the present embodiment, the generator 540 is a steam turbine generator. However, the present disclosure is not limited to this, and the generator 540 may include at least one of the following generators instead of (or in addition to) the steam turbine generator: a gas turbine generator, a diesel engine generator, a gas engine generator, and a biomass generator. The area 500 may include a cogeneration system that uses heat generated during power generation.

Building employees etc. go in and out of the building 550. The building 550 includes various electrical devices (e.g., lighting fixtures and air conditioners) that are run by the power supplied from the microgrid MG. A server 551 manages the power state (power consumption, power generation, and power storage) of the building 550. The server 551 communicates with the server 200 to transmit the power state of the building 550 to the server 200 and receive a power balancing command for the building 550 from the server 200.

The residence 560 includes various electrical devices (e.g., lighting fixtures and air conditioners) that are run by the power supplied from the microgrid MG. A server 561 manages the power state (power consumption, power generation, and power storage) of the residence 560. The server 561 communicates with the server 200 to transmit the power state of the residence 560 to the server 200 and receive a power balancing command for the residence 560 from the server 200.

Figure 2:
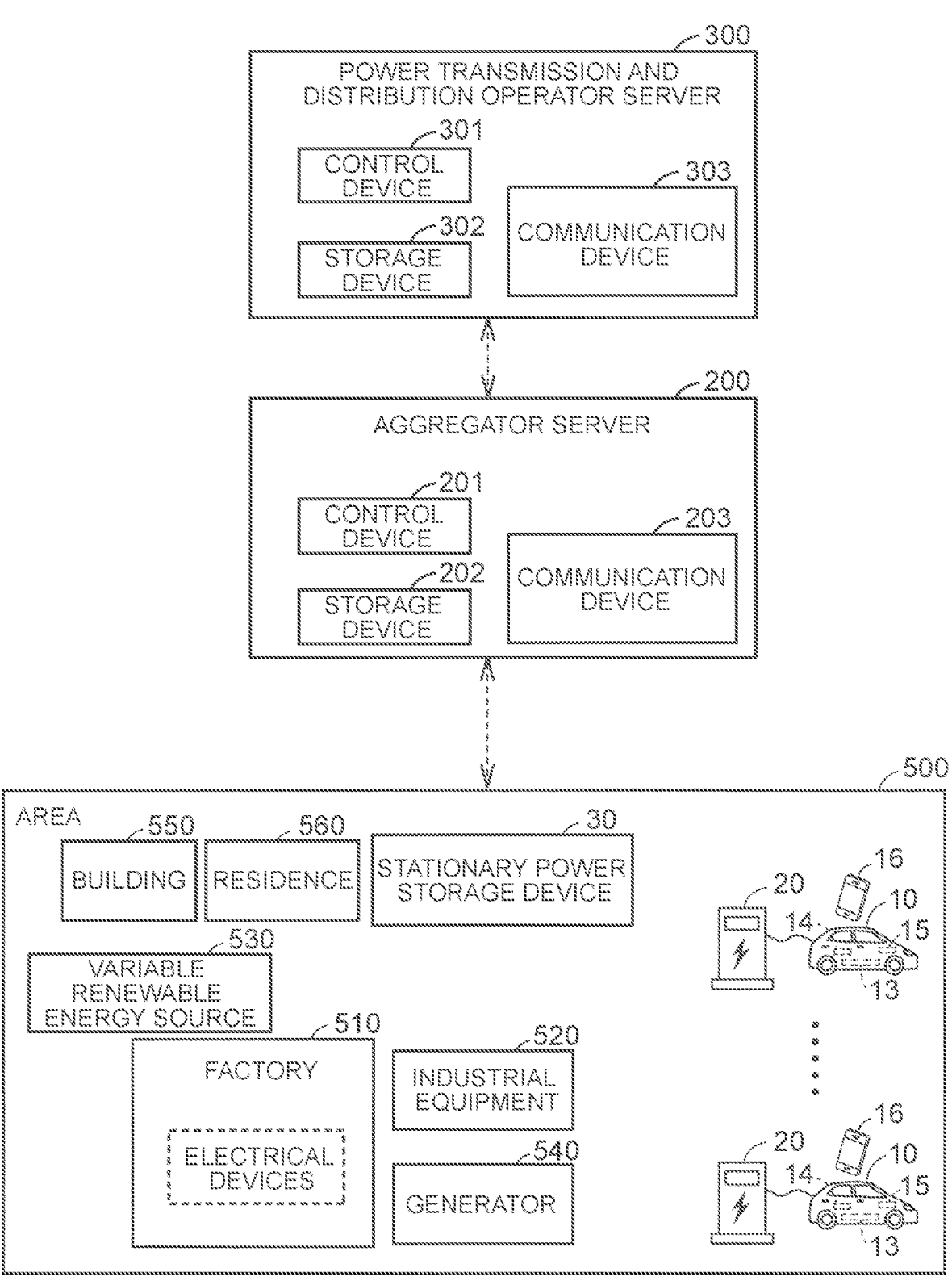
FIG. 2 shows a detailed configuration of the electric power system according to the first embodiment.

FIG. 2 shows internal configurations of the servers 200, 300 and the hybrid electric vehicle 10a (10b). As shown in FIG. 2, each of the servers 200, 300 includes a control device 201, 301, a storage device 202, 302, and a communication device 203, 303, respectively. Each of the control devices 201, 301 includes a processor. The processor is configured to perform predetermined information processing. The storage devices 202, 302 are configured to store various kinds of information. The storage devices 202, 302 store, in addition to programs to be executed by the control devices 201, 301, respectively, information to be used in the programs (e.g., maps, mathematical formulas, and various parameters). Each of the communication devices 203, 303 includes various communication interfaces (I/Fs). The control devices 201, 301 are configured to communicate with the outside through the communication devices 203, 303, respectively. For simplicity, the servers 511, 551, 561 are not shown in FIG. 2. The control device 201 and the communication device 203 are an example of the "control unit" and "communication unit" of the present disclosure, respectively.

The hybrid electric vehicle 10a (10b) includes, in addition to the battery 13, a charger and discharger 14 that adjusts the charge and discharge power of the battery 13, and an electronic control unit (ECU) 15 that controls the charger and discharger 14. The ECU 15 includes a processor (e.g., a central processing unit (CPU)), a random access memory (RAM), a storage device, and a timer (none of which are shown). The ECU 15 may be a microcomputer. For simplicity, the engine 11 and the traction motor 12 are not shown in FIG. 2.

The battery 13 includes a secondary battery that stores power for moving the hybrid electric vehicle 10a (10b). In the present embodiment, an assembled battery including a plurality of lithium-ion batteries is used as the secondary battery. The assembled battery is composed of a plurality of single cells (commonly also referred to as "cells") electrically connected to each other. Other power storage devices such as an electric double layer capacitor may be used instead of the secondary battery.

In the present embodiment, direct current (DC) EVSE units are used as the EVSE units 20. Therefore, DC power is supplied from the vehicle 10 (10a, 10b) to the EVSE unit 20. An inverter in the EVSE unit 20 coverts the supplied direct current to alternating current. The charger and discharger 14 is configured to adjust the charge and discharge power by, for example, a direct current-to-direct current (DC-to-DC) converter. The DC EVSE standard may be any of the following: CHAdeMO, Combined Charging System (CCS), GB/T, and Tesla. However, it is not essential that EVSE units 20 be DC EVSE units, and EVSE units 20 may be AC EVSE units. In the form in which the vehicle 10 (10a, 10b) externally supplies power to the AC EVSE unit, the charger and discharger 14 may include a rectifier circuit, a power factor correction (PFC) circuit, an isolation circuit (e.g., an isolation transformer), an inverter, and a filter circuit. The charger and discharger 14 may perform DC-to-AC conversion of the power discharged from the battery 13, and the obtained AC power may be supplied from the vehicle 10 (10a, 10b) to the EVSE unit.

The user of each vehicle 10 (10a, 10b) carries a mobile terminal 16. In the present embodiment, each mobile terminal 16 is a smartphone with a touch panel display. However, the present disclosure is not limited to this, and each mobile terminal 16 may be any desired mobile terminal, and may be, for example, a tablet terminal, a wearable device (e.g., a smart watch), or an electronic key. Predetermined application software (hereinafter simply referred to as the "application") is installed in each mobile terminal 16. Each mobile terminal 16 is configured to transmit and receive information to and from the server 200 through the application. The user can transmit a driving plan of the vehicle 10 (10a, 10b) belonging to the user to the server 200 by operating the mobile terminal 16. Examples of the driving plan of the vehicle 10 (10a, 10b) include a driving schedule of a POV (e.g., departure time from home, destination, and arrival time) and an operation schedule of a MaaS vehicle.

The server 200 is configured to manage information on each registered user (hereinafter also referred to as the "user information"), information on each registered vehicle 10 (hereinafter also referred to as the "vehicle information"), information on each registered EVSE unit 20 (hereinafter also referred to as the "EVSE information"), and information on the registered stationary power storage device 30 (hereinafter also referred to as the "PS information"). The user information, the vehicle information, the EVSE information, and the PS information are distinguished by identification information (ID) and stored in the storage device 202.

The vehicle information includes information on whether each vehicle 10 is equipped with the engine 11, information on whether each vehicle 10 can perform external charging, and information on the amount of fuel remaining in each vehicle 10. The server 200 (communication device 203) communicates with each vehicle 10 to acquire from each vehicle 10 the vehicle information (information on whether the each vehicle 10 is equipped with the engine 11, information on whether the each vehicle 10 can perform external charging, and information on the amount of fuel remaining in the each vehicle 10).

A user identification (ID) is identification information for identifying the user. The user ID also functions as information for identifying the mobile terminal 16 carried by the user (terminal ID). The server 200 is configured to distinguish information received from the mobile terminals 16 by the user IDs and save the information. The user information includes, for example, a communication address of the mobile terminal 16 carried by each user, and a vehicle ID of the vehicle 10 belonging to each user.

The vehicle ID is identification information for identifying the vehicle 10. The vehicle ID may be a vehicle identification number (VIN). The vehicle information includes the driving plan of each vehicle 10. An EVSE-ID is identification information for identifying the EVSE unit 20. EVSE information includes a communication address of each EVSE unit 20 and the state of the vehicle 10 connected to each EVSE unit 20. The EVSE information also includes information indicating a combination of the vehicle 10 and the EVSE unit 20 connected to each other (e.g., a combination of the EVSE-ID and the vehicle ID). The vehicle 10 may be configured to directly wirelessly communicate with the server 200. The vehicle 10 may include a Data Communication Module (DCM) or may include a communication I/F compatible with the fifth generation mobile communication system (5G).

A PS-ID is identification information for identifying the stationary power storage device 30. The PS information includes the state and communication address of the stationary power storage device 30. The server 200 is configured to store the state (e.g., state of charge (SOC)) of the stationary powerstorage device 30 received from the stationary power storage device 30 in association with the PS-ID.

Figure 3:
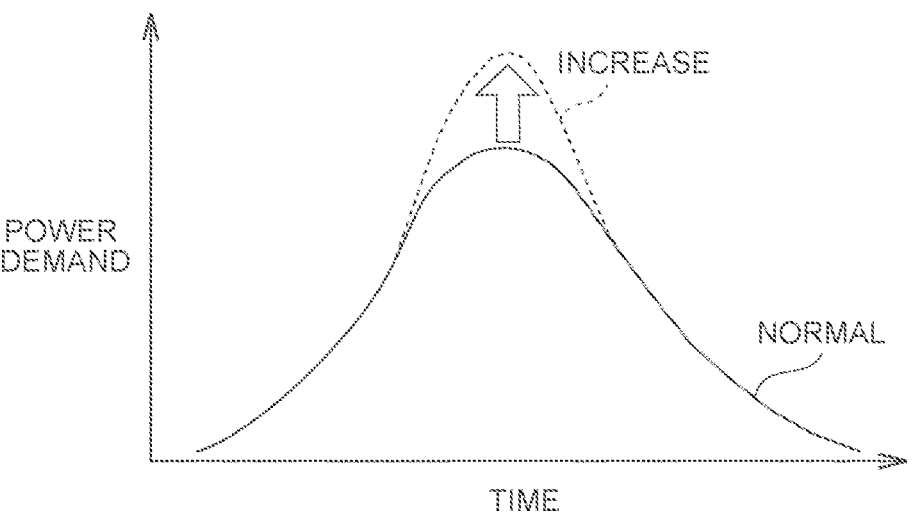
FIG. 3 is a graph showing the power demand of a power grid.

As shown in FIG. 1, the server 300 transmits a request to adjust the power demand of the power grid PG (supply and demand balancing request) to the server 200, based on the power generation and consumption of each power balancing resource in the area 500. For example, when the power generation of the variable renewable energy source 530 is expected to be larger than normal (or is currently large), the server 300 transmits a request to increase the power demand more than normal (see dashed line in FIG. 3) to the server 200.

The server 200 requests the vehicle 10 to perform external charging as one means for increasing the power demand of the power grid PG. The control device 201 of the server 200 performs control to select a hybrid electric vehicle (10a, 10b) to which external charging is to be requested, based on the vehicle information acquired by the communication device 203.

In JP 2018-099920 A, control s performed to determine the priority of requesting external charging based on whether the vehicle is equipped with an internal combustion engine. However, in the control of JP 2018-099920 A, it is difficult to determine the priority when each of a plurality of vehicles is equipped with an internal combustion engine. An inappropriate vehicle may therefore be selected as a vehicle that is to perform external charging. In this case, the vehicle selected as a vehicle that is to perform external charging reduces the SOC in preparation for the external charging, so that the SOC of the selected vehicle may become insufficient. This may affect traveling of the selected vehicle. Therefore, a device (system) is desired that can reduce the possibility that traveling of the hybrid electric vehicle (10a, 10b) that is to perform external charging (and external discharge) may be affected.

Accordingly, in the first embodiment, the server 200 (control device 201) is configured to select the hybrid electric vehicle 10a with a large amount of fuel remaining as a vehicle to which external charging is to be preferentially requested from the hybrid electric vehicles 10a, 10b based on the vehicle information of the hybrid electric vehicle 10a and the vehicle information of the hybrid electric vehicle 10b. An example in which the amount of fuel remaining in the hybrid electric vehicle 10a is larger than the amount of fuel remaining in the hybrid electric vehicle 10b is described in the first embodiment. However, the present disclosure is not limited to this. When the amount of fuel remaining in the hybrid electric vehicle lob is larger than the amount of fuel remaining in the hybrid electric vehicle 10a, the hybrid electric vehicle 10b is preferentially selected as a vehicle to which external charging is to be requested.

The server 200 may select a vehicle with a large amount of fuel remaining (a large amount of fuel actually remaining in the fuel tank) as a vehicle with a large amount of fuel remaining, or may select a vehicle with a long travelable distance based on the remaining amount of fuel as a vehicle with a large amount of fuel remaining. The server 200 may select a vehicle with a high ratio of the amount of fuel remaining in the fuel tank to the capacity of the fuel tank as a vehicle with a large amount of fuel remaining.

The hybrid electric vehicle 10a with a relatively large amount of furl remaining can travel a relatively long distance with the fuel even when its SOC drops to a level that affects traveling of the hybrid electric vehicle 10a. Therefore, the hybrid electric vehicle 10a is less likely to have a problem traveling even when its SOC is reduced. The server 200 therefore selects the hybrid electric vehicle 10a with a relatively large amount of fuel as a vehicle to which external charging is to be preferentially requested.

In the first embodiment, an example in which there are two hybrid electric vehicles (10a, 10b) is described for simplicity. However, the number of hybrid electric vehicles is not limited to two. For example, out of "n" ("n" is 3 or more) hybrid electric vehicles, one to "n−1" hybrid electric vehicles having a large amount of fuel remaining may be selected as a vehicle(s) to which external charging is to be requested.

The server 200 (control device 201) calculates a predicted increase in power demand of the power grid PG that will be caused by the external charging of the hybrid electric vehicle 10a. Specifically, the control device 201 calculates the predicted increase based on, for example, the driving plan of the hybrid electric vehicle 10a (e.g., departure time from home, destination, and arrival time).

The control device 201 of the server 200 calculates a target value of the increase in power demand of the power grid PG based on the supply and demand balancing request from the server 300. The storage device 202 stores the calculated target value. The target value may be calculated by the control device 301 of the server 300.

In the first embodiment, when the predicted increase in power demand of the power grid PG that will be caused by the external charging of the hybrid electric vehicle 10a is smaller than the target value calculated by the server 200, the server 200 (control device 201) also performs control to request external charging to the hybrid electric vehicle 10b. When there is a plurality of hybrid electric vehicles 10b, the server 200 may request external charging to a predetermined number (all or a part) of hybrid electric vehicles 10b, or the server 200 may calculate the number of hybrid electric vehicles 10b required for the predicted increase to become greater than the target value and request external charging to the calculated number of hybrid electric vehicles 10b. At this time, the server 200 (control device 201) may preferentially request external charging to the hybrid electric vehicles 10b in descending order of the amount of fuel remaining in the hybrid electric vehicle 10b. The increase in power demand does not mean the amount of increase in instantaneous value of the power demand at each time instant, but means the amount of increase in integrated value of the power demand for a predetermined time of day.

The description will be continued on the assumption that the server 200 requests external charging only to the hybrid electric vehicle 10a.

In the first embodiment, when the hybrid electric vehicle 10a accepts the request for external charging, the hybrid electric vehicle 10a (ECU 15, see FIG. 2) performs control to reduce its SOC.

The hybrid electric vehicle 10a (10b) is configured to travel in EV mode without starting the engine 11 when requested torque is equal to or less than threshold torque, and to start the engine 11 and travel when the requested torque is larger than the threshold torque. The requested torque is determined based on the amount of operation of an accelerator pedal (not shown) (accelerator operation amount) by the driver of the hybrid electric vehicle 10a (10b).

Figure 4A:
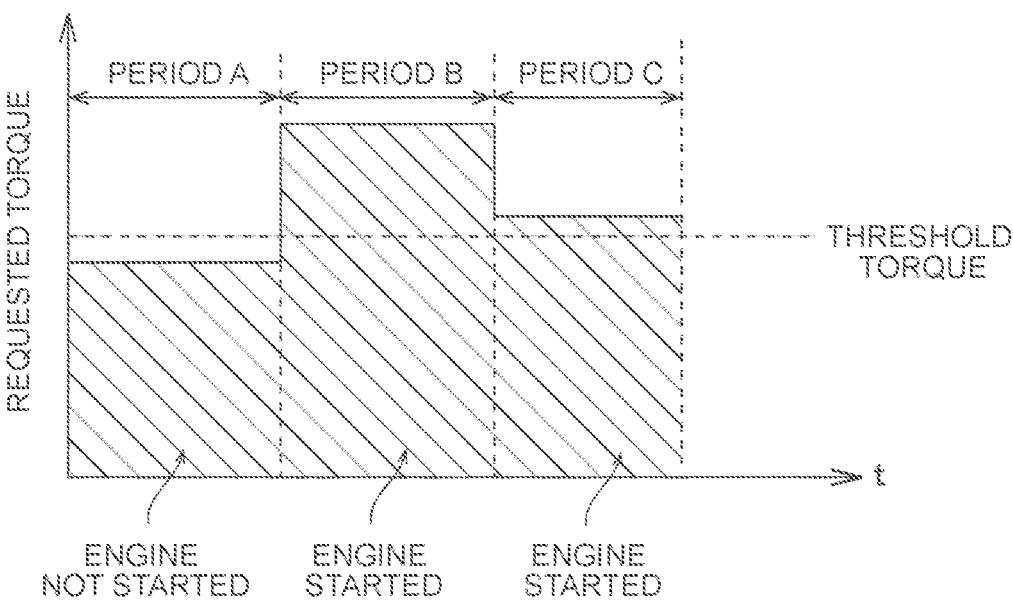
FIG. 4A is a graph showing requested torque of a hybrid electric vehicle.
Figure 4B:
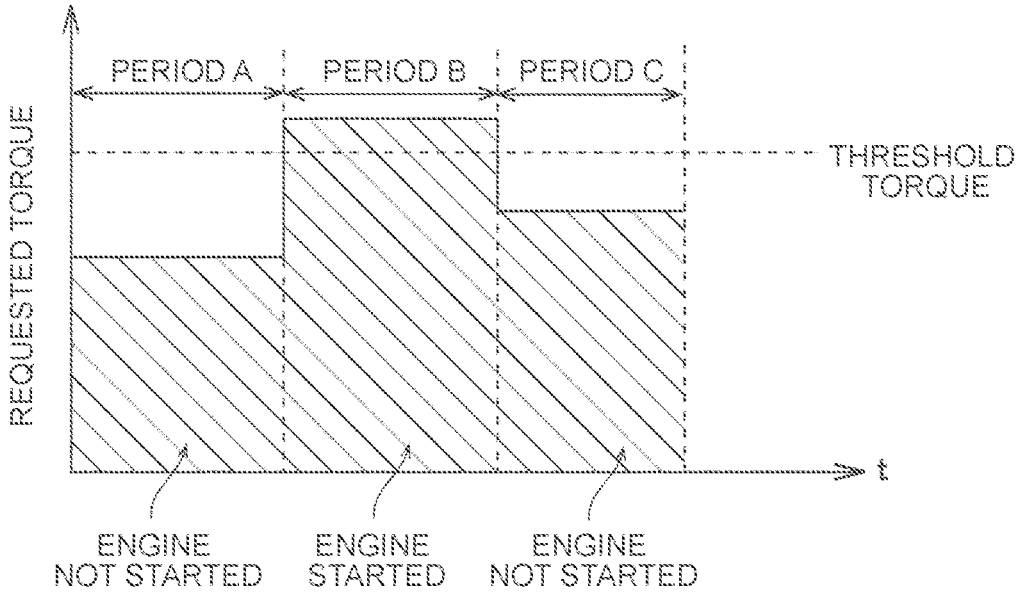
FIG. 4B is a graph showing the requested torque of the hybrid electric vehicle when threshold torque is increased.

As shown in FIGS. 4A and 4B, when the hybrid electric vehicle 10a (ECU 15) accepts the request for external charging, the hybrid electric vehicle 10a (ECU 15) performs, for example, control to increase the threshold torque. In the hybrid electric vehicle 10a, the engine 11 therefore becomes less likely to be started than before the threshold torque is increased. As a result, the hybrid electric vehicle 10a travels in EV mode without starting the engine 11 for a relatively long time. The SOC of the hybrid electric vehicle 10a can thus be more efficiently reduced. In the example shown in FIG. 4B, unlike before the threshold torque is increased (FIG. 4A), the engine 11 is not started during a period C as the threshold torque has been increased.

In the first embodiment, the hybrid electric vehicle 10a (ECU 15) is configured to adjust the amount by which its SOC is reduced, due to the amount of charging requested from the power grid PG. Specifically, the hybrid electric vehicle 10a (ECU 15) adjusts the amount by which its SOC is reduced by adjusting the amount by which the threshold torque is increased due to the amount of charging requested from the power grid PG. The hybrid electric vehicle 10a

(ECU 15) may perform the above control with reference to a map representing the relationship between the amount by which the threshold torque is increased and the requested amount of charging, or may calculate (compute) the amount by which the threshold torque is increased, based on the requested amount of charging.

Hybrid Electric Vehicle Management Method

Figure 5:
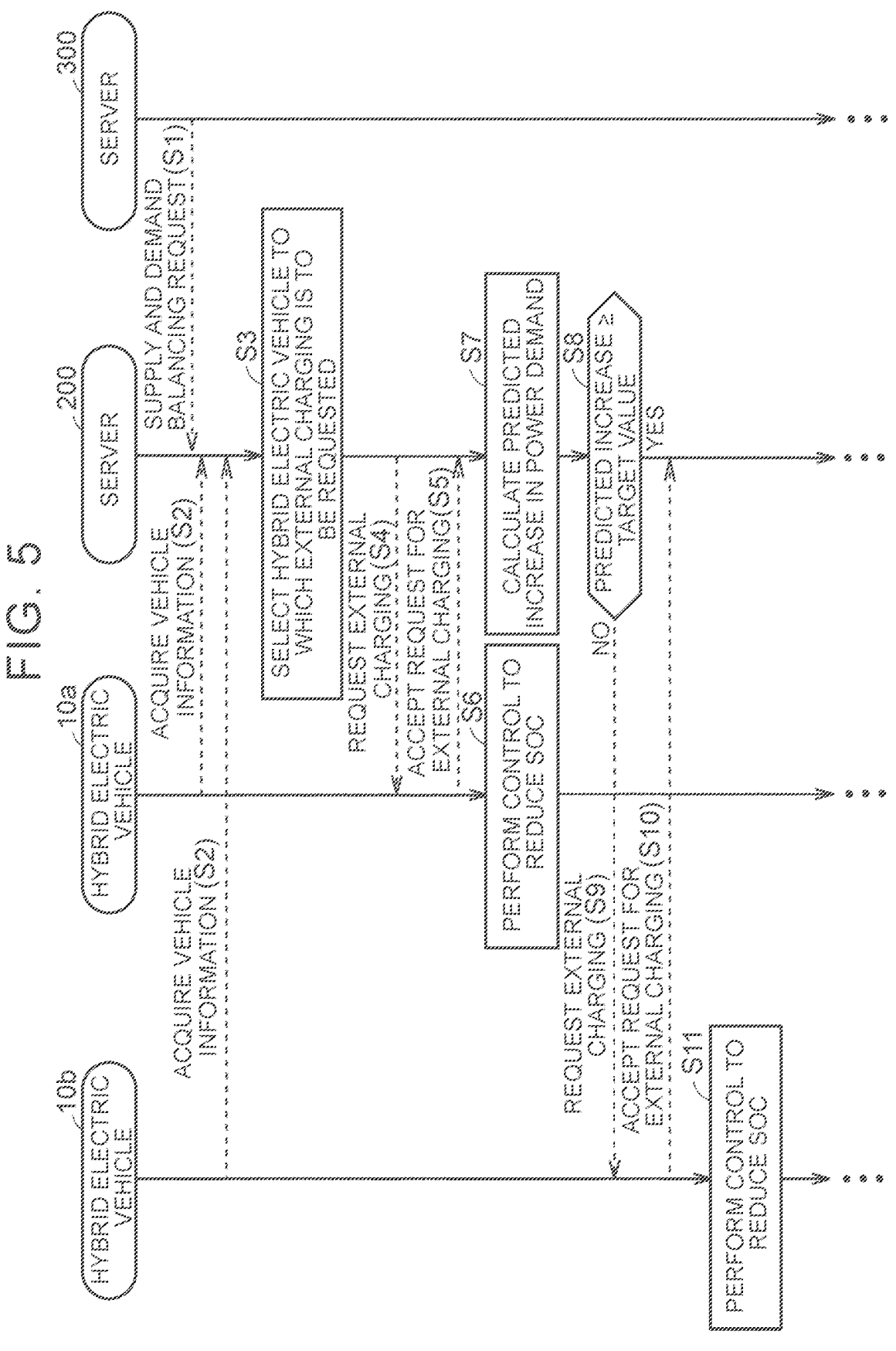
FIG. 5 is a sequence diagram of the electric power system according to the first embodiment.

Next, a method for managing the hybrid electric vehicles (10*a*, 10*b*) by the server 200 (electric power system 1) will be described with reference to the sequence diagram of FIG. 5.

First, in step S1, the server 200 receives a supply and demand balancing request from the server 300. As described above, the server 300 transmits the supply and demand balancing request to the server 200, based on the power generation and consumption of each power balancing resource in the area 500. Specifically, it is herein assumed that a signal for increasing the power demand of the power grid PG more than normal has been transmitted to the server 200.

Next, in step S2, the server 200 communicates with the hybrid electric vehicle 10*a* and the hybrid electric vehicle 10*b* to acquire the vehicle information including information on whether the hybrid electric vehicle 10*a*, 10*b* is equipped with the engine 11, information on whether the hybrid electric vehicle 10*a*, 10*b* can perform external charging, and information on the amount of fuel remaining in the hybrid electric vehicle 10*a*, 10*b*. The order of steps S1, S2 may be opposite to that described above.

Then, in step S3, the server 200 selects a hybrid electric vehicle to which external charging is to be preferentially requested out of the hybrid electric vehicles 10*a*, 10*b* based on the vehicle information of the hybrid electric vehicle 10*a* and the vehicle information of the hybrid electric vehicle 10*b* acquired in step S2. Specifically, the server 200 selects a hybrid electric vehicle with a large amount of fuel remaining (in the first embodiment, the hybrid electric vehicle 10*a*) as a hybrid electric vehicle to which external charging is to be preferentially requested out of the hybrid electric vehicles 10*a*, 10*b*.

Thereafter, in step S4, the server 200 requests (makes an inquiry about) external charging to the hybrid electric vehicle 10*a* selected in step S3 through communication. The server 200 may directly transmit an inquiry signal for requesting external charging to the hybrid electric vehicle 10*a* or may transmit the inquiry signal to the mobile terminal 16 of the user (owner) of the hybrid electric vehicle 10*a*.

Subsequently, in step S5, the hybrid electric vehicle 10*a* transmits a response signal indicating acceptance of the request for external charging received in step S4 (indicating an intention to participate in external charging) to the server 200. When the hybrid electric vehicle 10*a* transmits a response signal indicating rejection of the request for external charging to the server 200 in step S5, the server 200 may request external charging to the hybrid electric vehicle 10*b* instead of the hybrid electric vehicle 10*a*. The response signal may be transmitted from the user's mobile terminal 16 to the server 200.

Thereafter, in step S6, the hybrid electric vehicle 10*a* (ECU 15) having accepted the request for external charging performs control to reduce its SOC based on the transmission of the response signal. The hybrid electric vehicle 10*a* (ECU 15) adjusts the amount by which its SOC is reduced according to the amount of charging requested from the power grid PG.

Specifically, the hybrid electric vehicle 10*a* (ECU 15) reduces its SOC by increasing the threshold torque for starting the engine 11. Specifically, the hybrid electric vehicle 10*a* (ECU 15) adjusts the amount by which its SOC is reduced by adjusting the amount by which the threshold torque is increased.

Subsequently, in step S7, the server 200 calculates a predicted increase in power demand of the power grid PG that will be caused by the external charging of the hybrid electric vehicle 10*a* selected in step S3. The control for calculating the predicted increase may be performed before the control for selecting a hybrid electric vehicle in step S3. In the above example, it is described that step S7 is performed after step S6. However, steps S6, S7 need not necessarily be performed in this order.

Thereafter, in step S8, the server 200 determines whether the predicted increase in power demand of the power grid PG that will be caused by the external charging of the hybrid electric vehicle 10*a* as calculated in step S7 is equal to or larger than a target value calculated by the server 200. When the predicted increase is smaller than the target value (No in step S8), the server 200 also requests external charging to the hybrid electric vehicle 10*b* (step S9). When the predicted increase is equal to or larger than the target value (Yes in step S8), the server 200 does not request external charging to the hybrid electric vehicle 10*b*.

Subsequently, in step S10, the hybrid electric vehicle 10*b* transmits a response signal indicating acceptance of the request for external charging received in step S9 (indicating an intention to participate in external charging) to the server 200.

In step S11, the hybrid electric vehicle 10*b* (ECU 15) having accepted the request for external charging performs control to reduce its SOC based on the transmission of the response signal. The hybrid electric vehicle 10*b* (ECU 15) adjusts the amount by which its SOC is reduced due to the amount of charging requested from the power grid PG. For example, the hybrid electric vehicle 10*b* (ECU 15) adjusts the amount by which its SOC is reduced by increasing the threshold torque as described above.

In the case where the predicted increase is still smaller than the target value even when the external charging of the hybrid electric vehicle 10*b* is performed, the server 200 requests external charging to other hybrid electric vehicle. The control for requesting external charging is repeated until the predicted increase becomes equal to or larger than the target value.

As described above, in the first embodiment, the server 200 preferentially selects the hybrid electric vehicle 10*a* with a large amount of fuel remaining as a vehicle to which external charging is to be requested out of the hybrid electric vehicles 10*a*, 10*b* based on the vehicle information of the hybrid electric vehicle 10*a* and the vehicle information of the hybrid electric vehicle 10*b*. Since a relatively large amount of fuel remains in the hybrid electric vehicle 10*a*, traveling of the hybrid electric vehicle 10*a* will be less likely to be affected even when the SOC of the hybrid electric vehicle 10*a* is greatly reduced before the external charging. Accordingly, the SOC of the hybrid electric vehicle 10*a* can be relatively greatly reduced before the external charging. The hybrid electric vehicle 10*a* with a large amount of fuel remaining can therefore be charged with a relatively large amount of power by the external charging. As a result, the power demand of the power grid. PG can be easily increased.

Second Embodiment

Next, control in a server 400 (electric power system 21) according to a second embodiment of the present disclosure will be described. In the second embodiment, unlike the first embodiment in which the server 200 requests external charging to the hybrid electric vehicle (10a, 10b), the server 400 requests external discharging to the hybrid electric vehicle (10a, 10b). The same configurations as those of the first embodiment are denoted by the same signs as those in the first embodiment, and detailed description will not be repeated.

Figure 6:
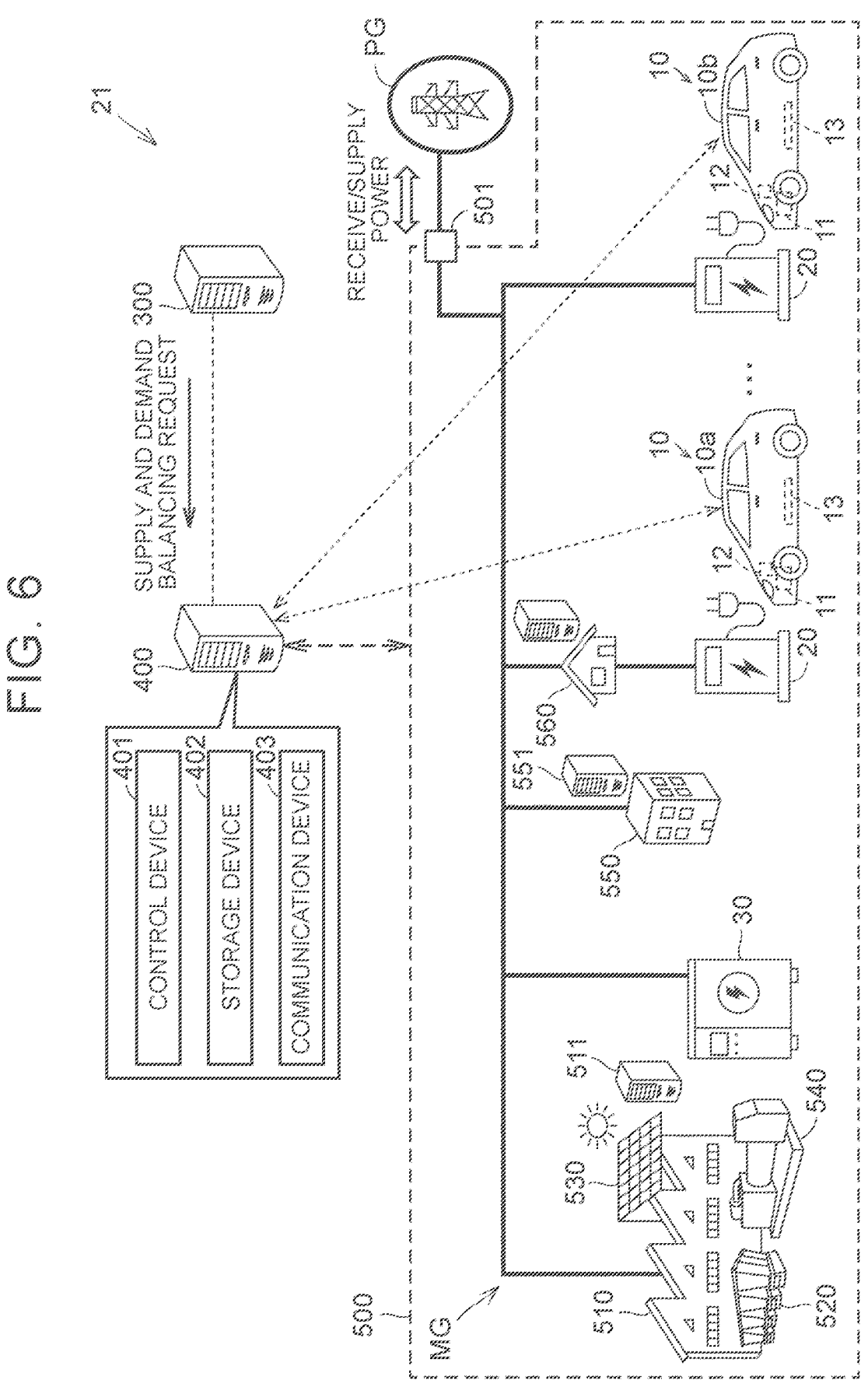
FIG. 6 shows a configuration of an electric power system according to a second embodiment.

FIG. 6 shows a schematic configuration of the electric power system 21 according to the second embodiment of the present disclosure. The server 400 of the electric power system 21 includes a control device 401, a storage device 402, and a communication device 403. The electric power system 21 and the server 400 are an example of the "management system" and "management device" according to the present disclosure, respectively. The control device 401 and the communication device 403 are an example of the "control unit" and "communication unit" of the present disclosure, respectively.

The communication device 403 of the server 400 communicates with each vehicle 10 to acquire vehicle information including information on whether the vehicle 10 is equipped with the engine 11, information on whether the vehicle 10 can perform external discharging, and information on the amount of fuel remaining in the vehicle 10.

When, for example, there is not enough power available on the power grid PG, the server 400 requests external discharging to the vehicle 10 as one means for increasing the amount of power on the power grid PG. External discharging means that the vehicle 10 supplies the power discharged in the EVSE unit 20 to the power grid PG. The control device 401 of the server 400 performs control to select a hybrid electric vehicle (10a, 10b) to which external discharging is to be requested, based on the vehicle information acquired by the communication device 403.

Accordingly, in the second embodiment, the server 400 (control device 401) is configured to select the hybrid electric vehicle 10a with a large amount of fuel remaining as a vehicle to which external discharging is to be preferentially requested out of the hybrid electric vehicles 10a, 10b based on the vehicle information of the hybrid electric vehicle 10a and the vehicle information of the hybrid electric vehicle 10b. When the amount of fuel remaining in the hybrid electric vehicle 10b is larger than the amount of fuel remaining in the hybrid electric vehicle 10a, the hybrid electric vehicle 10b is preferentially selected as a vehicle to which external discharging is to be requested.

The hybrid electric vehicle 10a with a relatively large amount of fuel remaining can travel a relatively long distance with the fuel even when its SOC is relatively greatly reduced due to the external discharging. Selecting a hybrid electric vehicle (10a, 10b) to which external discharging is to be requested based on the remaining amount of fuel can thus reduce the possibility that traveling of the hybrid electric vehicle (10a, 10b) that is to perform external discharging may be affected.

The server 400 (control device 401) may also request external discharging to the hybrid electric vehicle 10b when the amount of power predicted to be supplied by the external discharging of the hybrid electric vehicle 10a is smaller than the amount of power required by the power grid PG.

In the second embodiment, the hybrid electric vehicle 10a that has accepted the request for external discharging may perform, for example, control to reduce the threshold torque. This control increases the operating rate of the engine 11 of the hybrid electric vehicle 10a and reduces a decrease in SOC of the hybrid electric vehicle 10a. As a result, the hybrid electric vehicle 10a can secure more power to be supplied to the power grid PG. For example, the hybrid electric vehicle 10a may adjust the amount by which the threshold torque is reduced due to the amount of discharging requested from the power grid. PG.

Hybrid Electric Vehicle Management Method

Figure 7:
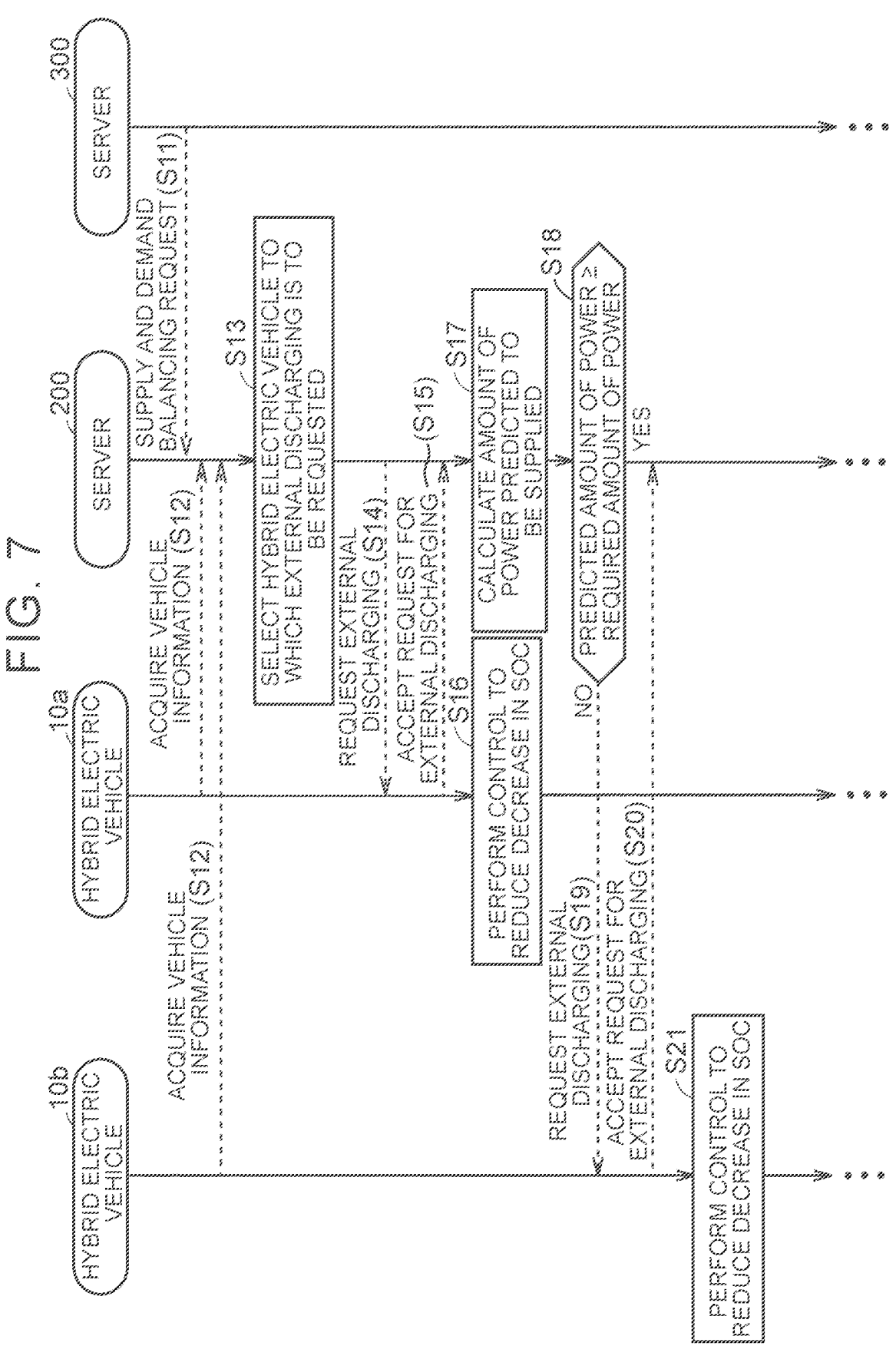
FIG. 7 is a sequence diagram of the electric power system according to the second embodiment.

Next, a method for managing the hybrid electric vehicles (10a, 10b) by the server 400 (electric power system 21) will be described with reference to the sequence diagram of FIG. 7. Description of the same contents as those in the sequence diagram of the first embodiment (see FIG. 5) will not be repeated.

First, it is herein assumed that, since the amount of power on the power grid PG is less than normal, a request signal requesting supply of electric power to the power grid PG is transmitted from the server 300 to the server 400 in step S11.

Next, in step S12, the server 400 communicates with the hybrid electric vehicle 10a and the hybrid electric vehicle 10b to acquire the vehicle information including information on whether the hybrid electric vehicle 10a, 10b is equipped with the engine 11, information on whether the hybrid electric vehicle 10a, 10b can perform external discharging, and information on the amount of fuel remaining in the hybrid electric vehicle 10a, 10b. The order of steps S11, S12 may be opposite to that described above.

Then, in step S13, the server 400 selects a hybrid electric vehicle to which external discharging is to be preferentially requested out of the hybrid electric vehicles 10a, 10b based on the vehicle information of the hybrid electric vehicle 10a and the vehicle information of the hybrid electric vehicle 101) acquired in step S12. Specifically, the server 400 selects a hybrid electric vehicle with a large amount of fuel remaining (in the second embodiment, the hybrid electric vehicle 10a) as a hybrid electric vehicle to which external discharging is to be preferentially requested out of the hybrid electric vehicles 10a, 10b.

Thereafter, in step S14, the server 400 requests (makes an inquiry about) external discharging to the hybrid electric vehicle 10a selected in step S13 through communication.

Subsequently, in step S15, the hybrid electric vehicle 10a transmits a response signal indicating acceptance of the request for external discharging received in step S14 (indicating an intention to participate in external discharging) to the server 400.

Thereafter, in step S16, the hybrid electric vehicle 10a (ECU 15) having accepted the request for external discharging performs control to reduce a decrease in its SOC by, for example, reducing the threshold torque, based on the transmission of the response signal.

Subsequently, in step S17, the server 400 calculates the amount of power predicted to be supplied to the power grid PG by the external discharging of the hybrid electric vehicle 10a selected in step S13. The control for calculating the predicted amount of power may be performed before the control for selecting a hybrid electric vehicle in step S13.

Thereafter, in step S18, the server 400 determines whether the amount of power predicted to be supplied to the power grid. PG by the external discharging of the hybrid electric vehicle 10a as calculated in step S17 is equal to or larger than the amount of power required by the power grid PG. When the predicted amount of power is smaller than the required amount of power (No in step S18), the server 400 also requests external discharging to the hybrid electric vehicle 10b (step S19). When the predicted amount of power is equal to or larger than the required amount of power (Yes in step S18), the server 400 does not request external discharging to the hybrid electric vehicle 10b.

Subsequently, in step S20, the hybrid electric vehicle 10*b* transmits a response signal indicating acceptance of the request for external discharging that is received in step S19 (indicating an intention to participate in external discharging) to the server 400.

In step S21, the hybrid electric vehicle 10*b* (ECU 15) having accepted the request for external discharging performs control to reduce a decrease in its SOC based on the transmission of the response signal. For example, the hybrid electric vehicle 10*b* (ECU 15) performs control to reduce a decrease in its SOC by reducing the threshold torque.

In the case where the predicted amount of power is still smaller than the required amount of power even when the external discharging of the hybrid electric vehicle 10*b* is performed, the server 400 requests external discharging to other hybrid electric vehicle. The control for requesting external discharging is repeated until the predicted amount of power becomes equal to or larger than the required amount of power.

As described above, in the second embodiment, the server 400 preferentially selects the hybrid electric vehicle 10*a* with a large amount of fuel remaining as a hybrid electric vehicle to which external discharging is to be requested out of the hybrid electric vehicles 10*a*, 10*b*. The hybrid electric vehicle 10*a* with a relatively large amount of fuel remaining can travel a relatively long distance with the fuel even when its SOC is relatively greatly reduced due to the external discharging. A relatively large amount of power can therefore be discharged from the hybrid electric vehicle 10*a* with a large amount of fuel remaining by the external charging. As a result, the amount of power on the power grid PG can be easily increased.

The configuration of the second embodiment is otherwise similar to that of the first embodiment.

An example in which the server 200 (400) requests either external charging or external discharging to the hybrid electric vehicle (10*a*, 10*b*) is described in the first and second embodiments. However, the present disclosure is not limited to this. The server may be configured to request both external charging and external discharging to the hybrid electric vehicle (10*a*, 10*b*).

An example in which the hybrid electric vehicle 10*a* (10*b*) adjusts its SOC by adjusting the threshold torque is described in the first and second embodiments. However, the present disclosure is not limited to this. The hybrid electric vehicle 10*a* (10*b*) may adjust its SOC by a method other than adjusting the threshold torque (e.g., adjusting power consumption of an air conditioner or adjusting the regenerative brake).

The embodiments disclosed herein should be considered to be illustrative and not restrictive in all respects. The scope of the present disclosure is shown by the claims rather than by the above description of the embodiments, and is intended to include all modifications within the meaning and scope equivalent to the claims.

What is claimed is:

1. A hybrid electric vehicle management system, comprising:

a plurality of hybrid electric vehicles that include an internal combustion engine configured to generate electric power, an electric traction motor, and a battery that supplies electric power to the electric traction motor, the plurality of hybrid electric vehicles being configured to perform either or both of external charging, in which the battery is charged with electric power from an electrical network, or external discharging, in which electric power in the battery is supplied to the electrical network; and a management device configured to:

acquire vehicle information of each hybrid electric vehicle of the plurality of hybrid electric vehicles by communicating with each hybrid electric vehicle, the acquired vehicle information of each hybrid electric vehicle indicating whether the hybrid electric vehicle is able to perform either or both of the external charging or the external discharging, and indicating an amount of fuel remaining in the hybrid electric vehicle;

compare the amount of fuel remaining in each hybrid electric vehicle;

select a hybrid electric vehicle having a most fuel remaining from among the plurality of hybrid electric vehicles to which the external discharging is to be requested; and transmit a first external discharging request to the selected hybrid electric vehicle for the selected hybrid electric vehicle to perform the external discharging, wherein the selected hybrid electric vehicle is configured to travel without starting the internal combustion engine when a torque demand of the selected hybrid electric vehicle is below a threshold torque, and to start the internal combustion engine and travel when the torque demand exceeds the threshold torque, the threshold torque being used to determine whether the selected hybrid electric vehicle travels using the internal combustion engine or the battery, as a power source, wherein the selected hybrid electric vehicle is configured to reduce the threshold torque such that an amount by which the amount of a state of charge of the battery of the selected hybrid electric vehicle decreases is reduced compared to before accepting the request for external discharging, and wherein the management device is configured to:

determine whether a predicted increase in power demand of the electrical network is equal to or larger than a target value, the predicted increase being caused by the external charging of the selected hybrid electric vehicle; and transmit a second external discharging request to at least one non-selected hybrid electric vehicle of the non-selected hybrid electric vehicles when the predicted increase is smaller than the target value, the second external discharging request being the first external discharging request.

2. The hybrid electric vehicle management system according to claim 1, wherein the torque demand is determined based on an accelerator operation amount of the selected hybrid electric vehicle.

* * * * *